(12) United States Patent
Silva

(10) Patent No.: US 12,518,046 B2
(45) Date of Patent: Jan. 6, 2026

(54) COMPUTER SYSTEM AND METHOD FOR SEARCH AUTHORIZATION COMPLIANCE DURING FORENSIC DATA ACQUISITION IN A DIGITAL FORENSIC INVESTIGATION

(71) Applicant: Magnet Forensics Inc., Waterloo (CA)

(72) Inventor: Eugenio Silva, Kitchener (CA)

(73) Assignee: Magnet Forensics Inc., Waterloo (CA)

( * ) Notice: Subject to any disclaimer, the term of this patent is extended or adjusted under 35 U.S.C. 154(b) by 200 days.

(21) Appl. No.: 18/325,674

(22) Filed: May 30, 2023

(65) Prior Publication Data

US 2023/0385439 A1 Nov. 30, 2023

Related U.S. Application Data

(60) Provisional application No. 63/346,664, filed on May 27, 2022.

(51) Int. Cl.
*G06F 16/242* (2019.01)
*G06F 21/62* (2013.01)
*G06Q 50/26* (2012.01)

(52) U.S. Cl.
CPC ...... *G06F 21/6227* (2013.01); *G06F 16/2445* (2019.01); *G06Q 50/26* (2013.01)

(58) Field of Classification Search
CPC .. G06F 16/2445; G06F 21/6227; G06Q 50/26
See application file for complete search history.

(56) References Cited

U.S. PATENT DOCUMENTS

| | | | |
|---|---|---|---|
| 8,458,805 B2 * | 6/2013 | Adelstein | H04L 63/14 726/30 |
| 8,793,795 B1 * | 7/2014 | Ravid | G06F 21/78 726/24 |
| 11,704,431 B2 * | 7/2023 | Kraus | H04L 63/0414 726/26 |
| 2004/0260733 A1 * | 12/2004 | Adelstein | H04L 63/123 709/224 |
| 2021/0049264 A1 | 2/2021 | Barrow et al. | |
| 2023/0177201 A1 * | 6/2023 | Durand | G06F 21/6227 726/4 |

* cited by examiner

*Primary Examiner* — Dangelino N Gortayo
(74) *Attorney, Agent, or Firm* — Own Innovation; James W. Hinton; Caitlyn O'Flynn

(57) ABSTRACT

A system and method for selectively acquiring forensic data from at least one electronic storage medium of a target device to comply with a search authorization is provided. The method includes: configuring a set of search criteria based on at least one authorized search parameter extracted from a search authorization; configuring a forensic data acquisition module based on the set of search criteria; scanning a target dataset stored in the at least one electronic storage medium of the target device using the forensic data acquisition module to identify data items that are compliant with the set of search criteria; acquiring the compliant data items from the target device to an external data storage medium; and generating a log comprising a record for each scanned data item in the target dataset specifying whether the scanned data item met the search criteria and whether the scanned data item was acquired.

17 Claims, 8 Drawing Sheets

Existing Technique

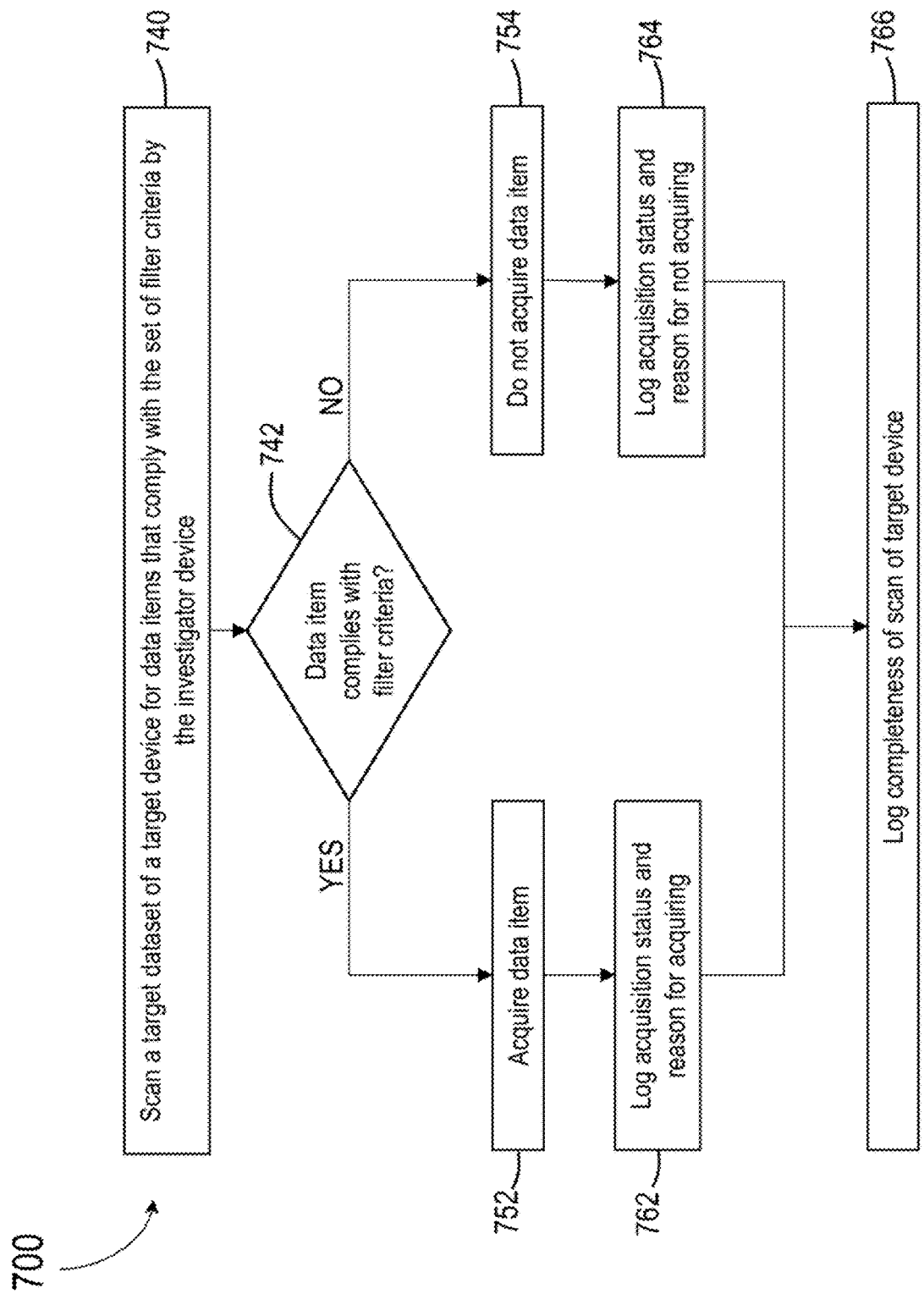

Appendix A

Things to be Seized

1. Documents will assist in determining the ownership, possession and control of the computer system(s) seized.

2. Digital devices; specifically a *Samsung cellular device, a large tablet style device, an LG block cellular device and an unknown branded computer system (possibly with a "beats" logo)* with storage media capable of holding data, as well as, cables, peripheral components and operating manuals needed to operate the digital devices; and written memory aids containing passwords (such as sticky notes, memo pads, and note books) and digital passcode generators.

3. *Any Digital Video Discs (DVD discs) with names indicative of child pornography as described by the victim.*

4. Documents that will assist in proving who occupied the place to be searched and had control of or access to the preceding things to be seized, including but not limited to utility bills, rental agreements, correspondence, identification documents and personal photos and videos.

Data to be Reproduced

5. If officers use a computer system found at the place to search data and reproduce it for seizure, then that searching and any subsequent examination of the data is subject to the Terms and Conditions stipulated below.

Terms and Conditions

6. Examination of the data in any digital device seized, and any data reproduced from a computer system, shall be limited to seeking:

a. data relevant to the offences listed in Appendix B, specifically:

(i) images of child pornography contained within any digital image and digital video files downloaded between January 1st, 2019 to March 27, 2019.

(ii) Any record of user account data, communication, files shared and contact between the user Matthew ▇▇▇▇ with the victim Santana ▇▇▇▇

(iii) Any mobile back up data located on the unknown branded computer system.

(iv) passwords, passcodes and encryption keys needed to access any of the preceding data b. and, data:

(i) relating to ownership, possession, access, use, or control of the device and/or its data (ii) relating to the configuration of the device's systems and programmes 7. No examination shall be carried out for the purpose of acquiring data created, or communications transmitted, after the issuance of this warrant.

Figure 8

COMPUTER SYSTEM AND METHOD FOR SEARCH AUTHORIZATION COMPLIANCE DURING FORENSIC DATA ACQUISITION IN A DIGITAL FORENSIC INVESTIGATION

TECHNICAL FIELD

The embodiments disclosed herein relate generally to digital forensics, and, in particular to systems and methods for filtering a target dataset before acquisition to a comply with authorized search parameters.

INTRODUCTION

In a digital forensic investigation, an investigator must identify files and/or data from electronic storage media of a device of interest ("target device") which are relevant to an investigation. An investigation may be limited in what is allowed to be searched on and acquired from the target device by a search authorization specifying parameters of the search, such as a search warrant or judicial authorization. Currently, searching methods include acquiring a digital forensic image of the target device and then searching or processing the acquired forensic image for forensically relevant data within the rules of the search authorization. However, such an approach to digital forensic investigation of a target device can lead to the acquisition and searching of data from the target device that falls outside the scope of the search authorization, which can present privacy issues such as by infringing on a warrant subject's reasonable expectation of privacy. Currently, in many jurisdictions, acquisition of files outside of the scope of a search warrant is a gray area for privacy concerns. But, for example, in the Supreme Court of Canada cases concerning a citizen's expectation of privacy for their digital data are becoming more common. Therefore, a solution is needed as soon as possible as the issue may become black and white in the near future.

Accordingly, there is a need for systems and methods which allow for filtering of the dataset prior to acquisition of data/files from a target device such that data acquired from the target device is compliant with authorized search parameters.

SUMMARY

A method of filtering data for acquisition during a digital forensic investigation of a target dataset stored on a target device is provided. The method includes: extracting at least one parameter from a search authorization; generating a set of filter criteria from the at least one parameter by an investigator device; storing the set of filter criteria in a memory of the investigator device, scanning the target dataset by the investigator device using the set of filter criteria to identify data items which comply with the set of filter criteria; acquiring the data items which comply with the set of filter criteria and store the data items in the memory of the investigator device; logging all scanned data items of the target dataset in a log; and storing the log of the scanned data items in the memory of the investigator device.

The at least one parameter may include at least one exclusive parameter.

The at last one parameter may include at least one inclusive parameter.

The at least one parameter may be input manually by an investigator.

The at least one parameter may be automatically extracted from the search authorization by the investigator device. Extracting the at least one parameter may be performed using optical character recognition. The search authorization may be electronic and may include text fields and the at least one parameter may be extracted from the text fields.

The log may include an acquisition status for each scanned data item. The log may include a reason for compliance for each scanned data item which may be acquired.

The log may include a reason for non-compliance for each scanned data item which may be not acquired.

Each unacquired scanned data item in the log may be unidentifiable.

The log may include a representation of the file system of the target device.

The log may include an indication of how much of the target dataset was searched.

Acquiring the data items which comply with the set of filter criteria may include executing at least a first refining module for extracting a first data artifact type from the target dataset, the first data artifact type included in the at least one parameter extracted from the search authorization.

A system for filtering data for acquisition during a digital forensic investigation of a target dataset stored on a target device is provided. The system includes: an investigator device comprising: at least one processor including: a search authorization module operable to extract at least one parameter from a search authorization and to generate a set of filter criteria based on the at least on parameter; an acquisition module operable to scan the target dataset using the set of filter criteria and acquire data items which comply with the filter criteria; and a logging module to create a log of scanned data items of the target dataset; and a memory to store the extracted at least one parameter, the set of filter criteria, the acquired data items, and the log.

The search authorization module may include a manual submodule operable to allow a user to manually input the at least one parameter from the search authorization.

The search authorization module may include an automatic submodule operable to automatically extract the at least one parameter from the search authorization.

The automatic submodule may use optical character recognition to extract the at least one parameter.

The search authorization may be electronic and may include text fields and the at least one parameter may be extracted from the text fields by the automatic submodule.

The log may include a status of each scanned data item in the target dataset.

The status may include an acquisition status.

The status may include a reason for acquisition status.

The log may include an indication of the thoroughness of the scan.

The system may further include at least a first refining module configured to scan the target dataset for data artifacts which comply with the filter criteria.

The acquisition module may be configured to execute at least a first refining module configured to extract a first data artifact type from the target dataset, and wherein the first data artifact type may be extracted as an authorized search parameter from the search authorization by the search authorization module.

A system for filtering data for acquisition during a digital forensic investigation of a target dataset stored on a target device is provided. The system includes: an investigator device comprising at least one processor configured to execute: a search authorization module operable to extract at least one parameter from a search authorization and to generate a set of filter criteria based on the at least on parameter, the at least one parameter including a first data artifact type; a refining module operable to extract the first data artifact type from the target dataset; an acquisition module operable to scan the target dataset using the set of filter criteria and acquire data items which comply with the filter criteria, the scanning including executing the refining module to extract data artifacts of the first data artifact type that comply with the filter criteria from the target dataset; and a logging module to create a log of scanned data items of the target dataset. The investigator device also includes a memory to store the extracted at least one parameter, the set of filter criteria, the first refining module, the acquired data items, the acquired data artifacts, and the log.

The search authorization module may be configured to automatically choose at least one refining module which matches the set of filter criteria.

The search authorization module may be configured for an investigator to manually choose at least one refining module which matches the set of filter criteria.

The acquisition module may be configured to automatically choose at least one refining module which matches the set of filter criteria.

The acquisition module may be configured for an investigator to manually choose at least one refining module which matches the set of filter criteria.

A method of selectively acquiring forensic data from at least one electronic storage medium of a target device for forensic investigation is provided. The method includes: configuring a set of search criteria based on at least one authorized search parameter extracted from a search authorization; configuring a forensic data acquisition module based on the set of search criteria; scanning a target dataset stored in the at least one electronic storage medium of the target device using the forensic data acquisition module to identify data items that are compliant with the set of search criteria; acquiring the compliant data items from the target device to an external data storage medium; and generating a log comprising a record for each scanned data item in the target dataset specifying whether the scanned data item met the search criteria and whether the scanned data item was acquired.

Configuring the forensic data acquisition module based on the set of search criteria may include configuring the forensic data acquisition module to execute at least a first refining module for extracting a first data artifact type from the target dataset, the first data artifact type included in the at least one authorized search parameter extracted from the search authorization, and wherein scanning the target dataset may include scanning the target dataset for data artifacts of the first data artifact type that are compliant with the set of search criteria.

Other aspects and features will become apparent to those ordinarily skilled in the art upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 7 is a flow diagram of a method of search authorization compliant forensic data acquisition from a target device, according to an embodiment;

FIG. 8 is an example electronic search authorization that may be processed by the systems and methods of the present disclosure, according to an embodiment.

DETAILED DESCRIPTION

Figure 1:
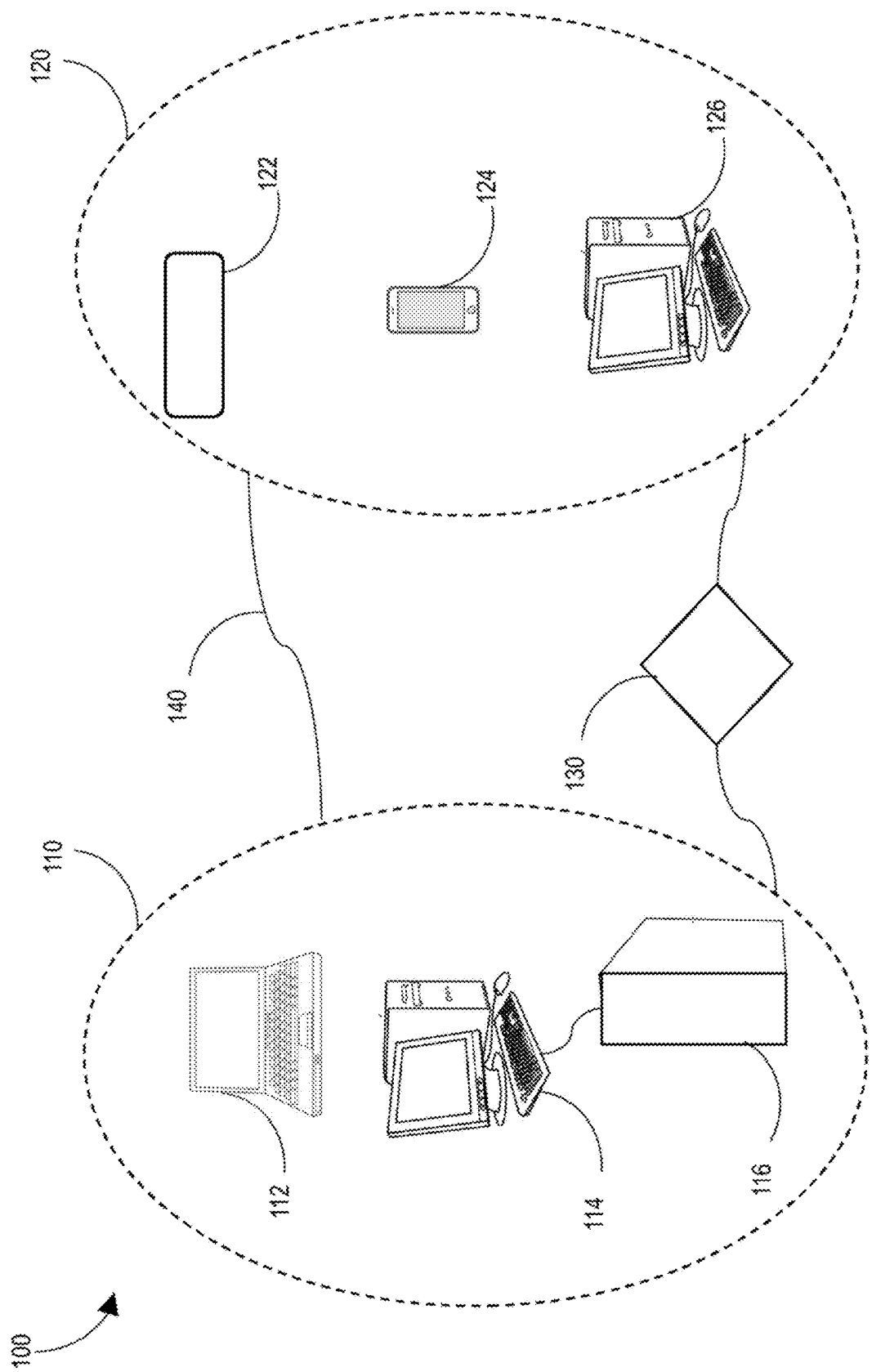
FIG. 1 is a schematic diagram of a system for acquiring data items from a target device in accordance with authorized search parameters for digital forensic investigation, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods, and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Generally, as used herein, the term "target device" refers to any device capable of storing data in electronic storage media (or data storage device) and which is subject to a search authorization specifying an authorized scope for digital forensic investigation of the target device. The term "target dataset" refers to the collection of electronically stored information or data stored on the electronic storage media, of which a subset may be acquired from the target device for digital forensic investigation in accordance with the parameters of an issued search authorization.

Herein, "data item", "data items", or similar are discussed. It is to be understood that these terms may include complete files but also encompasses data, metadata, partial files, hashes of files, reduced size files, or any other such information that can be scanned within the target dataset and may be useful to a digital forensic investigation.

The types of data items that might be authorized on a search authorization may include a generic artifact or data item class or category (e.g., Communications) or a more specific artifact or data item class or category, (e.g., Facebook Messenger messages). Other examples of generic and specific artifacts and data items would occur to those skilled in the art.

As an example, a more specific artifact or data item named in a search authorization may eliminate or exclude all other types of communication methods from being gathered. In contrast, a more generic artifact or data item class or category, such as 'Communications', may include a broader range of types of specific artifacts or data items (e.g. specific types or classes of artifacts or data items in the general class "communications").

Examples of types of data items and artifacts that may be authorized in a search authorization and searched for by the systems and methods of the present disclosure include, without limitation:

a) Address Book/Contacts (e.g. Outlook Contacts, Apple Contacts, Skype Contacts, Office365 Outlook Contacts, etc)
b) Communications (e.g. AIM, Discord Messages, Facebook Messenger, Apple's iMessage Chat & Messages, Microsoft Teams Messages, Skype Chat Messages, WeChat Messages, WhatsApp Messages, Yahoo! Messenger, Zoom Chat & Meeting Messages, Slack Workspace & Channels, etc)
c) Cloud Storage (e.g. Dropbox, Google Drive, Apple iCloud, Microsoft OneDrive, Office 365, Box.com, MEGA, etc)
d) Email (e.g. Email Messages, Webmail, and their attachments, etc)
e) Calendar Events (e.g. Outlook Appointments, Outlook Tasks, etc)
f) Audio Files (e.g. MP3, M4A, AMR, WAV, WMA, ACC, FLAC, etc)
g) Picture Files (e.g. JPG, HEIC/HEIF, BMP, TIFF, PNG, PSD, GIF, etc)
h) Video Files (e.g. MOV, HEVC, AVI, MP4, MPG, WMV, MKV, FLV, etc)
i) Documents (e.g. Microsoft Word, Microsoft Excel, Microsoft PowerPoint, Adobe Acrobat, Google Docs, Apple Pages, Apple Numbers, Apple Notes, Text Files, etc)
j) Peer-to-Peer Activity (e.g. Ares Downloads & Shared Files, Bitcoin, Coinbase Transactions & Cryptocurrency wallets & Logs, eMule Records & Shared Files, Frostwire Records & Shared Files, Gogatribe Shared Files, Limewire Shared Files, Torrent Activity and Shared Files, etc)
k) Social Networking & Social Media (e.g. Facebook, Google, Instagram Pictures & Post, LinkedIn Emails, Twitter, Tinder, TikTok, Tumblr, etc)
l) Web Browser Activity (e.g. Google Chrome, Microsoft Edge, Microsoft Internet Explorer, Mozilla Firefox, Opera, Apple Safari, Microsoft Xbox 360, etc)
m) Backups (e.g. Android Backup, Apple Disk Images, iOS Backups, Virtual Machines, etc)
n) Android Specific Artifacts (e.g. Device Information, Phone Call Logs, SMS Text Messages, MMS Messages, Contacts, Address Book, SnapChat, TextNow, Installed Applications, Usage History, Power History, and many similar applications as noted above—Facebook, Discord, Google Hangouts, Skype, Slack, WeChat, Wickr, Zoom, etc),
o) iOS Specific Artifacts (e.g. Device Information, Phone Call Logs, SMS Text Messages, MMS Messages, Messages, Contacts, Address Book, SnapChat, TextNow, Installed Applications, Usage History, Power History, Spotlight, AirDrop Activity, Siri Message Search, Apple Pay Transactions, and many similar applications as noted above—Facebook, Kik Messenger, Discord, Slack, WeChat, Wickr, Zoom, etc),
p) Cell Phone Specific Artifacts (e.g. We may want to just sum up the Android & iOS into one category. This way it could also include any future cell phone technologies and any legacy ones as well ie: BlackBerry OS, Windows Phones, Symbian and others).

Other examples of data items and artifacts would be apparent to those skilled in the art.

It is not uncommon for a search authorization to also include names and places as part of the search criteria. For example, a search authorization may specify: "Any Text Messages between John SMITH and Jane DOE" or "Any pictures taken with an Apple iPhone X".

In some cases, the search authorization may include data range data specifying a date range over which searching is authorized by the search authorization. For example, a search authorization may specify: "Any Text Message(s) between John SMITH and Jane DOE, between Apr. 1, 2022 and Apr. 5, 2022" or "Any pictures taken with an Apple iPhone X, between Apr. 1, 2022 and Apr. 5, 2022".

An example of a search authorization that may be processed and searched on by the systems and methods described herein is shown in FIG. 8.

Herein, "manual" or "manually" performing steps or searches is to be understood to mean that an investigator is using an investigator device to perform steps upon input from the investigator to the investigator device, for example searching a target dataset based on a keyword input by the investigator, in contrast to an "automatic" step which is performed by the investigator device, although an automatic step may require a manual input by the investigator to be initiated.

The present disclosure provides systems and methods for selectively acquiring data items from a target dataset of a target device for a digital forensic investigation in order to comply with authorized search parameters, such as may be provided in a search authorization. A search authorization may represent a warrant or other judicial authorization, or may represent written consent from a person to access certain information on their device (according to search parameters). Compliance with a search authorization may be accomplished by filtering data items on the target device prior to acquiring the data items, such that non-compliant data items never leave the target device. In digital forensic investigations, an arrest, conviction, or other result may depend on the compliance of the investigator(s) with the law. Even if an arrest or conviction is successful not following the law to respect the privacy of a person of interest may open the investigator(s) up for legal action to be taken against them. It is thus critically important that digital forensic systems and software tools be available to forensic investigators that enable compliance with such search authorizations.

Currently, during digital forensic investigations an investigator may acquire a full forensic image of the target device, which may include active and deleted data items, and then process and analyze the forensic image to identify data items of interest. In other cases, the investigator may perform an acquisition of only the active file system and not the deleted space or may perform a targeted acquisition of only certain drives, folders, file types, etc. However, privacy issues arise where data acquired from a target dataset of a target device includes data that falls outside the scope or parameters of a search authorization (e.g., warrant or other authorization allowing a search). For example, a search warrant may authorize the search and acquisition of image files between two dates. Using existing methods, the entire contents of the computer would be acquired and then an investigator would investigate image files from the date range. In the course of doing so, a copy of the entire contents of the computer has been acquired from the target device, which means that data outside the scope of the authorized search has been acquired and is searchable and accessible by persons other than the person of interest.

The present systems and methods provide for targeted acquisition of data for forensic investigation from a target device in accordance with authorized search parameters. Using the system, a target dataset searching criteria is configured, automatically or based on input provided to the system by a user, based on the parameters of a search authorization and the searching criteria used to configure a forensic data acquisition module. The forensic data acquisition module uses the target dataset searching criteria to acquire only those data items from the target device/electronic storage media that are within the authorized search parameters and thus comply with the search authorization. A log of the scanned data items may be generated. The log may record the performance of the forensic data acquisition module and the completeness of the scan. In some cases, the searching criteria may be filtering criteria used to filter data in the target dataset according to the authorized search parameters. In such cases, the forensic data acquisition module may include a filter component, configured via the filtering criteria, and the log may record performance of the filter component.

When performing the targeted acquisition based on the search authorization, the scanning of the target dataset is performed on the target device, such that non-compliant data items are only ever present on the target device (and not on the investigator device). This can ensure not only that non-compliant data items do not leave the target device but can also provide data integrity advantages that can be important in the digital forensic investigation context. By scanning the target dataset or a target data item while on the target device, the integrity of the dataset or data item remains intact, including any associated timestamps. If the scanning were to occur on the target dataset or the target data item after the dataset or data item was copied onto the investigator device, the file system timestamps for the target dataset may change to reflect the investigator device timestamps of when that dataset and/or data item was created. By scanning the target dataset or the target data item on the target device prior to acquisition, as described herein, it is ensured that the proper search or filter criteria were met prior to acquisition from the target device. If the scanning of the target dataset and/or the target data item occurs on the investigator device, and the search or filter criteria is not met, then an unlawful acquisition may have occurred, and this dataset may need to be deleted or removed from the acquired target dataset.

Referring now to FIG. 1, illustrated therein is a system 100 for acquiring authorized data items from a target dataset stored on electronic storage media of a target device, according to an embodiment. The system 100 includes an investigator device 110 and a target device 120.

The investigator device 110 may include at least one computing device having a memory and a processor configured to execute instructions to search and analyze data from the target device 120.

Examples of investigator devices include a laptop computer 112 and a desktop computer 114. The desktop computer 114 may be connected to a server 116. In other embodiments the laptop computer 112 may be connected to a server 116. In some embodiments, the laptop computer 112/desktop computer 114 may be connected to a cloud computer system (e.g., a cloud service such as Amazon AWS).

In various embodiments, the investigator device 110 may establish a communicative connection 140 to the target device 120 by a wireless connection or wired connection. The wired connection may be a data transfer cable, such as a USB cable or the like.

The investigator device 110 may be powered by an operating system such as Windows 10, Android, iOS, or the like.

The target device 120 may be any device capable of storing data and data items. The target device 120 stores a target dataset which may include forensically relevant data items ("forensic dataset"). The target device 120 may be, for example, a hard drive 122, a mobile device 124, or a desktop computer 126. In various embodiments, the target device 120 may be a seized device (e.g., seized from a suspect) or a corporate device (e.g., a corporate laptop of an employee). The target device 120 may be a cloud computing device, such as a cloud server. For example, the target device 120 may be a cloud computing device storing a target dataset linked to a cloud storage account of an individual under investigation.

The investigator devices 110 and target devices 120 shown in FIG. 1 and discussed herein represent various embodiments of systems and connections for searching for and analyzing data from a target device. That is, a single investigator device 110 or multiple investigator devices 110 may be directly or indirectly connected to target device(s) 120 to scan a target device dataset for data items. Herein, investigator devices are discussed which are operable to filter data items on the target device(s) 120 to determine which data items should be acquired (copied) from the target device(s) 120.

The cloud server 130 may be a single server or multiple servers. The cloud server 130 may be configured to process and store data. The cloud server 130 may further include forensic analysis software for processing and analyzing data transferred to the cloud server 130. The cloud server 130 may be connected to a cloud database for storing forensic data generated by or operated on by the system 100.

In other embodiments, the investigator device 110 may be communicatively connected to a non-cloud storage device and data may be stored in the non-cloud storage device. That is, in such embodiments the digital forensic investigation may be performed without the use of cloud computing.

While FIG. 1 shows an embodiment in which the investigator device 110 connects to the target device 120, other variations are contemplated.

In an embodiment, the target device 120 may include a software tool running on the target device 120 and implementing one or more methods described herein. The investigator may, for example, connect a USB or similar device to the target device 120 and run the tool on the hard drive of the target device 120. In such an embodiment, it can be considered that the target device includes the investigator device 110 or a component thereof as the functionalities of the investigator device 110 may be operating or executing on the target device 120 itself.

In another embodiment, the investigator device 110 may include a cloud computing component which may perform processing including one or more steps of the methods described herein. The investigator device 110 may include a client device running a client software component for communicating with the cloud computing component.

The system 100 may automatically produce a standardized digital report on any digital evidence collected from the target device. The report may have a standardized format. In some cases, the standardized format may be designed to meet certain legal or evidentiary requirements. For example, in order for the evidence collected to be admissible, the evidence may need to meet certain requirements or be collected or presented in a particular way. By generating a report in a standardized format that meets one or more such requirements, the report can be shared with prosecuting attorneys in a format that is most effective or useful. In some cases, the digital report may include log data or some subset thereof, such as described herein.

The investigator device 110 may be a purpose-built machine designed specifically for acquiring, processing, and reporting on forensic data. The investigator device 110 may store and run a digital forensic investigation software application including computer-executable instructions that, when executed by a processor, cause the investigator device to acquire, process, and report on forensic data. In particular, the forensic investigation software application may be configured to acquire forensic data, including data items and data artifacts (described below), from a target device in a manner that complies with terms of a search authorization limiting the scope of the search (authorized search parameters).

The forensic data may include data items of interest (or simply "data items"). Generally, data items can represent any data that can be retrieved from target device storage media, such as files, databases, folders, block data or byte ranges, volume information, file images, and the like.

On their own, data items generally may be viewed using a text preview, which converts the raw data into a text representation (e.g., using ASCII or UTF encoding), or in a binary or hexadecimal representation. However, reviewing large amounts of data items in this format is time-consuming and difficult. Therefore, the investigator device 110 may generate a plurality of data artifacts.

Data artifacts are a type of data item that represents one or more other data items in a structured way. A simple form of data artifact can be created or "refined" based on the filename extension of a data item retrieved from the target device. For example, the computing device may generate a data artifact of type "documents" for a data item with a file extension of .DOCX. However, more advanced data artifacts can also be generated through the use of one or more refining modules. For example, the computing device may search for data patterns indicative of particular file types, such as media files, to generate media data artifacts or text data artifacts, respectively. Such generation of data artifacts can occur regardless of whether attempts have been made to obfuscate the nature of a particular file, for example, by changing a file extension or even deleting a file (where the underlying raw data can be recovered from unused space on the target device storage media). Refining modules may be provided or defined for a wide variety of data artifacts.

Some types of data items may be used to generate more than one data artifact. For example, an e-mail database may be used to generate a large number of data artifacts corresponding to individual e-mail messages.

Data items, including data artifacts, may be stored in a data collection once generated. The data collection can be an electronic database file stored in a data storage device of the investigator device 110 or data storage device otherwise accessible to the investigator device 110. The electronic database file may be a relational database, such as MICROSOFT SQL SERVER™ or a non-relational database, such as a key-value database, NoSQL database, or the like. In some cases, a data collection may contain data items retrieved from more than one target device and, because data artifacts are a type of data item, the data collection may also contain data artifacts generated by the investigator device 110. Each data item in the data collection may be tagged with information to identify the target device that is the source of the data item. In some cases, a data collection may contain only records of data artifacts or data items, along with indications of where the source data can be retrieved (e.g., on the target device).

In generating a data artifact, the investigator device 110 may load at least one artifact definition from a memory where the artifact definition is pre-stored. Each artifact definition may define one or more artifact types to be scanned for in the data acquired from the target device.

Artifact definitions can be stored in the memory in the form of a structured data definition, such as an extensible markup language (XML) file, a Javascript Object Notation (JSON) file, or other suitable format or file. In particular, artifact definitions can be provided in the form of user-editable files, which can be created and loaded without the need to alter or re-compile the forensic data investigation software.

Each artifact definition may have a preamble or tag to define metadata regarding the artifact to be generated, such as a type, a name, a version, and the like. An example artifact definition preamble may be specified as follows: <Artifact type="Fragment" name="URL" version="1.0">.

Generally, there may be at least two primary types of artifact definitions: database-type artifact definitions and fragment-type artifact definitions. Each artifact definition defines at least one pattern to be matched in the acquired data to identify candidate artifacts. Database-type artifact definitions may be created to search within existing databases and, as such, may contain primarily parsing patterns as described herein. In contrast, fragment-type artifact definitions may be created to search any type of data, whether structured or unstructured and, as such, generally contain carving patterns as described herein. Both types of artifact definition can contain a source definition.

A source definition can be specified in the artifact definition as a pattern to be matched in identifying a possible source of data. In some cases, the source definition can be a filename (e.g., outlook.pst) or partial filename (e.g., .docx). In some cases, the source definition can include, or be, a regular expression.

One example source definition may be: <Source type="Filename">user.dat</Source>.

Source definitions can be useful for narrowing the search for data of interest. For example, a source definition as above may be used to identify only those files that are likely to contain data of interest, such as registry databases, e-mail databases, and other files or databases, thereby lowering the processing burden and false positives that may result from a broader search. Accordingly, artifact definitions may contain at least one source definition, to aid in the refining process. In some embodiments, only one source definition is permitted. However, in some other embodiments, multiple source definitions may be permitted, which can be combined using logical operands (e.g., AND, OR). Some artifact definitions, such as a fragment-type artifact definition, may omit a source definition altogether.

Another type of pattern which may be used in an artifact definition is a parsing pattern. Parsing patterns are those that rely on existing filesystem or database structures, or operational application programming interfaces in order to extract data. For example, one type of parsing pattern is an SQL query. As such, parsing patterns are generally used in database-type artifact definitions, and usually in conjunction with at least one source definition.

When searching for data within a database, a database-type artifact definition can contain at least one parsing definition. One type of parsing definition may specify a database table name definition with a table name to be searched for the data.

As an alternative to the table name definition, the parsing definition may include a database query definition, containing for example a SQL query, to be used within the database to retrieve the data subset of interest.

A database query can be constructed using a programmatic or query language. In some cases, the computing device may provide a graphical user interface to assist in generating a query.

As noted above, another type of pattern to be matched is a carving definition. Data carving is the process of extracting some data from a larger data set. As compared with parsing, data carving does not rely on existing file or database structures, or application programming interfaces. For example, data carving may be used during a digital investigation when corrupted files or unallocated file system space is analyzed to extract data. Generally, data can be "carved" from source data using specific header and footer values. As such, carving patterns are generally used in fragment-type artifact definitions.

When searching for a fragment-type artifact, an artifact definition contains a carving definition to identify a data subset in the acquired data. A carving definition generally contains one or more sub-definitions, used to specify more detailed characteristics of the data subset that is to be retrieved in order to generate a desired artifact.

When working with other types of data (e.g., other than data that can be parsed using a parsing definition), a carving definition can include a data pattern referred to as a "header" that can indicate the presence of a particular data subset of interest. In some embodiments, the header data pattern may be a requirement for a fragment-type artifact definition. The header data pattern may be an array or sequence of bytes, or multiple arrays of bytes, that are indicative of a desired file type. The header data pattern may also be in the form of a regular expression.

In some cases, the header data pattern may specify data that is embedded within a file of interest, not necessarily at the start of a file. Therefore, the header data pattern may further include a byte offset that can be used to indicate a number of bytes to traverse forward or backward when generating a desired artifact. For example, the header data pattern may identify a pattern of bytes that always occurs 30 bytes after the start of a desired file type, therefore, the byte offset can indicate to the computing device that it should construct the artifact by retrieving data beginning at 30 bytes prior to the location of the header data pattern. Likewise, the byte offset can be used to retrieve only data that comes after the header data pattern occurs in the data.

In some cases, the carving definition may include a footer data pattern. Similar to the header data pattern, the footer data pattern can be a byte array or arrays, or a regular expression that indicates the end of an artifact of interest.

In some cases, the carving definition may include a length definition, either in lieu of, or in addition to, the footer data pattern. In at least one embodiment, a length definition is required when a parsing definition is not present in the artifact definition. The length definition can include a minimum length of the artifact. Particularly in cases where a footer data pattern is not provided, the minimum length can be used to generate an artifact of a desired size. The length definition can also include a maximum length of the artifact, for example, to prevent generating artifacts over a predetermined size.

The length definition may also include an indication of the data endianness and a data type. Data type may indicate, for example, a string or numerical format (e.g., int32, uint16, sbyte, etc.).

In some embodiments, the length definition can provide for dynamic length definition. To determine the length of an artifact with dynamic length, typically the offset, endianness and type attributes should be provided. Based on the offset, endianness and type attributes, the computing device can compute a dynamic length of the payload for each artifact that is generated.

In some embodiments, each artifact definition may contain more than one source, parsing or carving definition, which can be combined using logical operators. In some embodiments, the logical operators can be specified in the artifact definition. In some cases, the source, parsing or carving definitions may be cumulative, such that all definitions must be matched to generate one artifact. However, in some other cases, the source, parsing or carving definitions may be additive, such that each successive definition is used to identify discrete elements of a particular artifact. For example, for a web browser history artifact, one carving definition may be used to locate a URL in the web browser history, while another parsing or carving definition may be used to locate cached images. The resulting artifact can combine both data subsets into a single artifact.

The investigator device 110 may be controlled and operated by a digital forensic investigator user.

As discussed above, the investigator device 110 may include at least one server computer, desktop computer, notebook computer, tablet, PDA, smartphone, a cloud service, or another computing device.

The investigator device 110 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage or may be received from the Internet or other network 130.

The investigator device 110 may include an input device. The input device may include any device for entering information into investigator device 110. For example, input device may be a keyboard, keypad, cursor-control device, touchscreen, camera, digital pen, stylus, or microphone.

A display device of the investigator device 110 may include any type of device for presenting visual information. For example, display device may be a computer monitor, a flat-screen display, a projector, or a display panel.

An output device of the investigator device 110 may include any type of device for presenting a hard copy of information, such as a printer for example. Output device may also include other types of output devices such as speakers, for example.

In some embodiments, investigator device 110 may include multiple of any one or more of processors, applications, software modules, second storage devices, network connections, input devices, output devices, and display devices.

Although investigator device 110 is described with various components, one skilled in the art will appreciate that the investigator device 110 may in some cases contain fewer, additional, or different components. In addition, although aspects of an implementation of the investigator device 110 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the investigator device 110 and/or processor to perform a particular method.

Investigator device 110 can be described performing certain acts. It will be appreciated that any one or more of the embodiments of investigator device 110 may perform an act automatically or in response to an interaction by a user of that device. That is, the user of the device may manipulate one or more input devices (e.g., a touchscreen, a mouse, or a button) causing the device to perform the described act. In many cases, this aspect may not be described below, but it will be understood.

The system 100 may enable investigators to collect evidence needed to help to initiate forensic investigations in a timely manner in order to help victims of crimes or to prosecute perpetrators of crimes efficiently and effectively. The system 100 may help secure key evidence such as by quickly capturing and preserving digital evidence. The system 100 allows a user to obtain evidence when it is available to collect information needed to help investigations.

Figure 2:
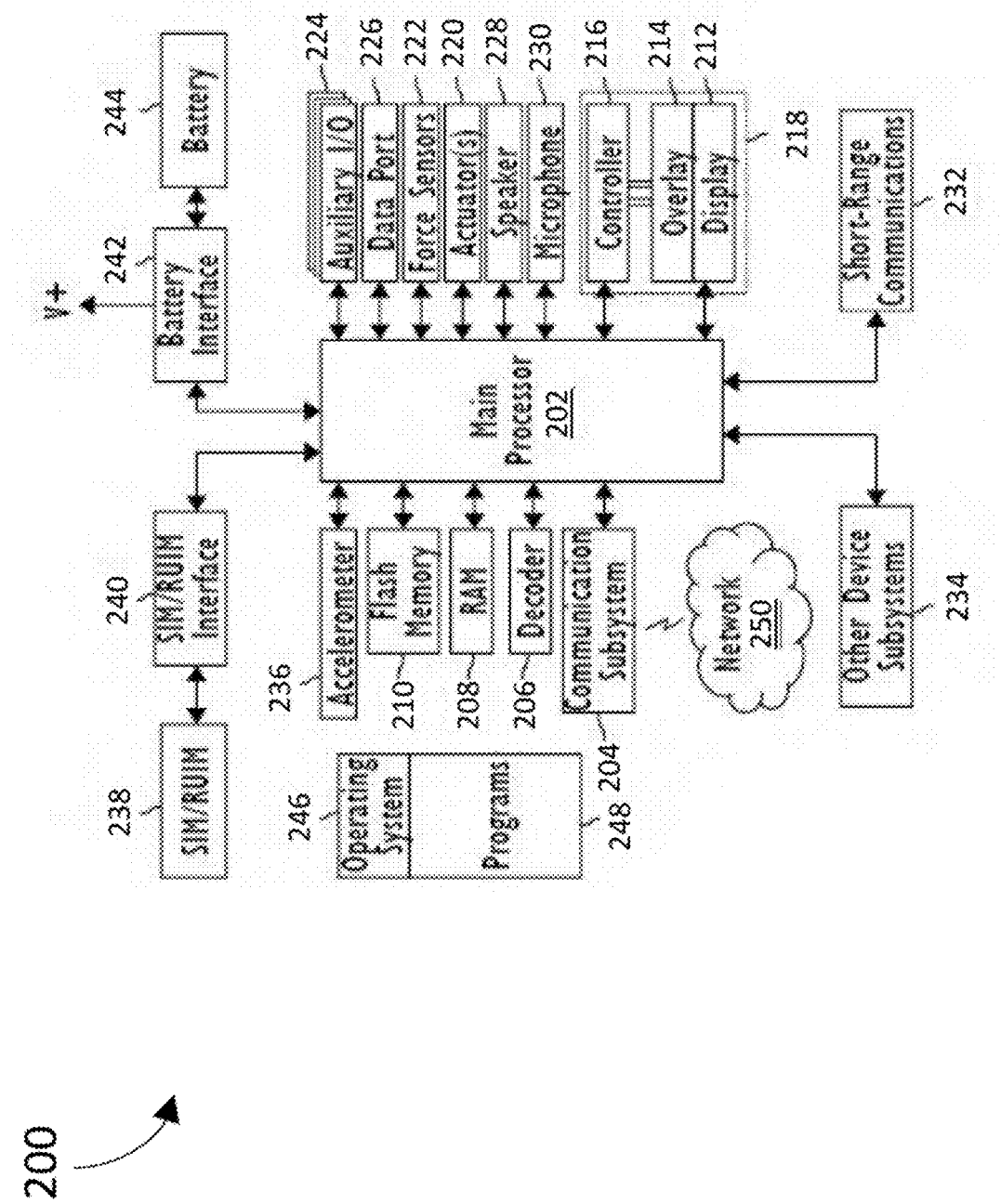
FIG. 2 is a block diagram of a computing device of FIG. 1, according to an embodiment.

FIG. 2 shows a simplified block diagram of components of a device 200, such as a mobile device or portable electronic device. The device 200 may be for example any of the devices shown or discussed in FIG. 1. The device 200 includes multiple components such as a processor 202 that controls the operations of the device 200. Communication functions, including data communications, voice communications, or both may be performed through a communication subsystem 204. Data received by the device 200 may be decompressed and decrypted by a decoder 206. The communication subsystem 204 may receive messages from and send messages to a wireless network 250.

The wireless network 250 may be any type of wireless network, including, but not limited to, data-centric wireless networks, voice-centric wireless networks, and dual-mode networks that support both voice and data communications.

The device 200 may be a battery-powered device and as shown includes a battery interface 242 for receiving one or more rechargeable batteries 244.

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a portable electronic device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access according to the present embodiment, the device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The device 200 also includes an operating system 246 and software components 248 that are executed by the processor 202 and which may be stored in a persistent data storage device such as the flash memory 210. Additional applications may be loaded onto the device 200 through the wireless network 250, the auxiliary I/O subsystem 224, the data port 226, the short-range communications subsystem 232, or any other suitable device subsystem 234.

For example, in use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the portable electronic device 200 may be similar. The speaker 228 may output audible information converted from electrical signals, and the microphone 230 may convert audible information into electrical signals for processing.

Figure 3:
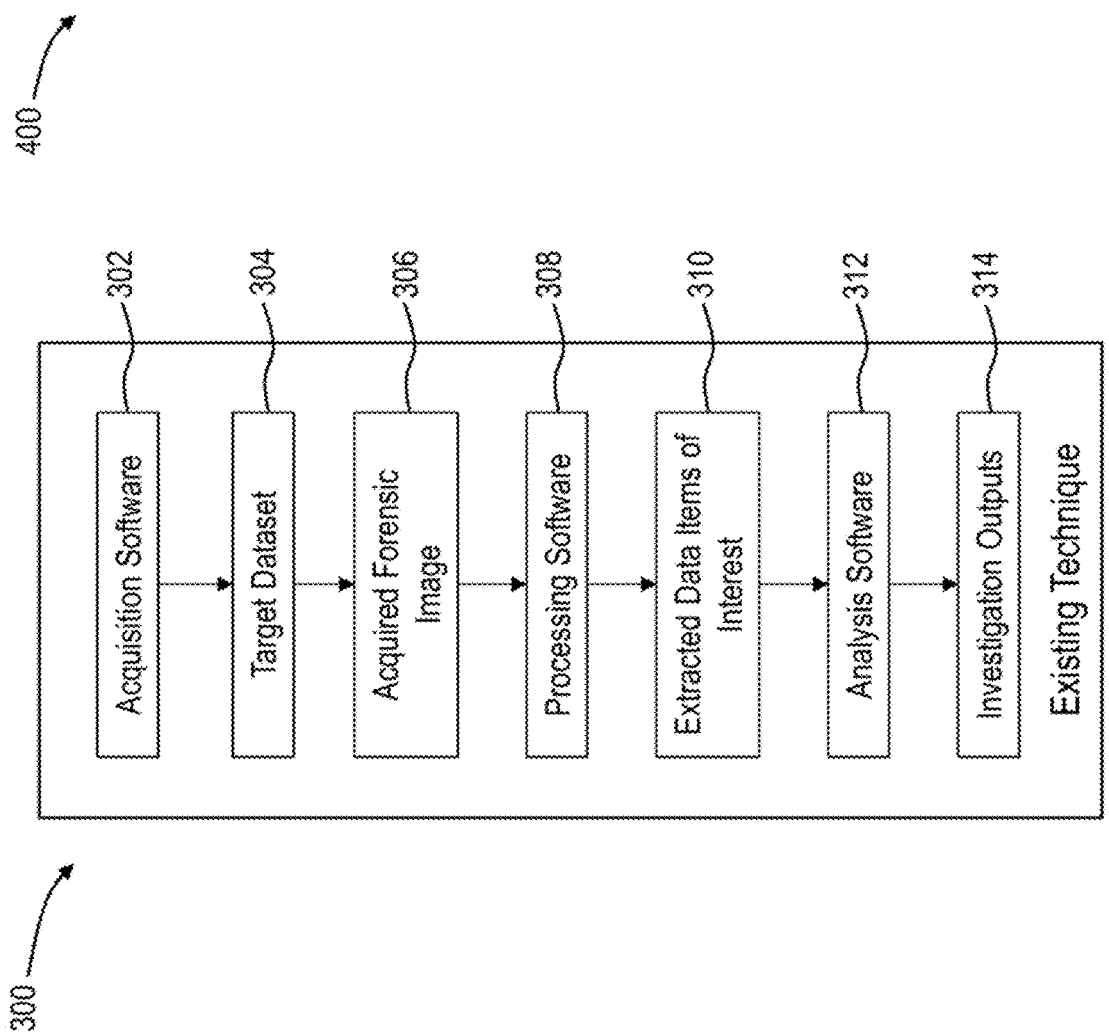
FIG. 3 is a block diagram of a pipeline for performing a digital forensic investigation, according to existing techniques.

Referring now to FIG. 3, illustrated therein is a block diagram representing a forensic investigation pipeline 300 without search authorization-compliant acquisition of forensic data from a target device.

In pipeline 300, acquisition software 302 on an investigator device may act on a target dataset 304 to acquire an acquired forensic image 306 of the target dataset 304. The acquired forensic image 306 may be stored in a memory of the investigator device. The acquired forensic image 306 may include the entire dataset or may only represent part of the target dataset. A partial acquisition may include, for example, acquiring only active (non-deleted) data items, acquiring data items from a particular drive, or acquiring only a certain data item type. Regardless of the approach used by acquisition software 302, the acquired forensic image 306 includes data from the target device that is outside the scope of a search authorization.

Processing software 308 may be used to process the acquired forensic image 306 and identify forensically relevant data items. The forensically relevant data items of interest may be extracted from the acquired forensic image as extracted data items of interest 310.

Analysis software 312 is used to analyze the extracted data items of interest and generate investigation outputs 314. Investigations outputs 314 may be any output that provides further insight into the investigation. For example, investigation outputs 314 may include a visualization of a timeline of events (assembled using various data items of interest and date/time metadata associated therewith), a visualization of connections between data items, a ranking of which data items are likely to be most important to the investigation, etc.

Any of the above software components may include steps which are run following manual input by an investigator and/or include steps which occur automatically.

Figure 4:
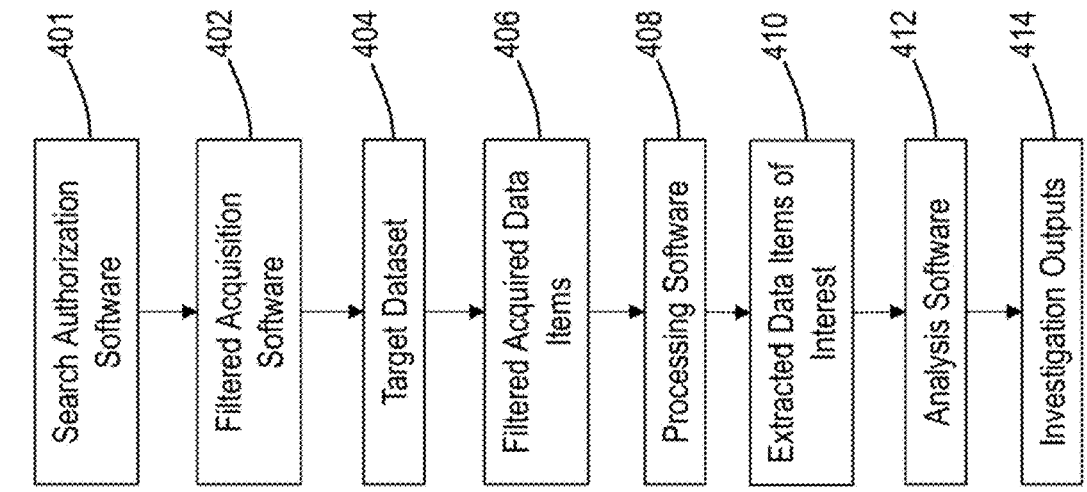
FIG. 4 is a block diagram of a pipeline for performing a digital forensic investigation wherein only data items which comply with authorized search parameters are acquired, according to an embodiment.

Referring now to FIG. 4, therein is a block diagram of a pipeline 400 for performing a digital forensic investigation including search authorization-compliant acquisition of data items from a target device, according to an embodiment.

In contrast to the digital forensic investigation 300 described in FIG. 3, a digital forensic investigation wherein only data items which comply with a search authorization are acquired does not begin by acquiring a complete or partial forensic image. Instead, search authorization software 401 extracts at least one authorized search parameter from a digital or electronic search authorization and generates a filter. The filter includes a set of filter criteria defined using the extracted authorized search parameters. In doing so, authorized search parameters are encoded in filter or search criteria. The filter can be used to acquire only data items from the target device which comply with the authorized search parameters encoded in the filter and thus with the search authorization.

Filtered acquisition software 402 then applies the filter criteria while scanning target dataset 404 on the target device and acquires filtered acquired data items 406. The filtered acquired data items 406 include a subset of data items of the target dataset that comply with the parameters of the search authorization encoded in the filter criteria of the filtered acquisition software 402. Beneficially, although additional time may be required to filter the target dataset before acquisition begins, the amount of data acquired from the target dataset will be reduced, resulting in less time to acquire the filtered acquired data items 406 and less memory used to hold the filtered acquired data items 406 as compared to a complete or partial acquisition of the target dataset as for acquired forensic image 306 of FIG. 3.

The filtered acquisition software 402 may also generate a log of scanned data items of the target dataset. The log data may include a record for each scanned data item in the target dataset. The log may include status information for each scanned data item indicating whether the data item was compliant with the filter criteria or not, and whether the data item was acquired or not. The log may include a reason for acquisition for each acquired data item (e.g., the data item complied with X criteria from the filter criteria) and a reason for not acquiring each unacquired data item (e.g., the data item did not comply with X criteria from the filter criteria). For example, in cases where multiple filter criteria are encoded in the filtered acquisition software, the log may indicate which filter criteria was satisfied for an acquired data item. Unacquired data items may be assigned a name that does not provide any actual information about the data item. The log may include a representation of the file system of the target dataset. That is, the log may provide an overview of visualization of the file system including drives, folder, file types, etc. This representation of the file system may be used to prove that, although only some data items were acquired, all of the data items were scanned for compliance.

The rest of the investigation may proceed similarly to what occurs with the processing software 308, extracted data items of interest 310, analysis software 312, and investigations outputs 314 of FIG. 3.

Processing software 408 is used to perform a search for data items of interest to an investigation. The data items of interest are extracted from the filtered acquired data items 406 as extracted data items of interest 410. Beneficially, the collection of filtered acquired data items 406 is likely to be smaller than the acquired forensic image 306 of FIG. 3, and therefore the time and processing power required to process the filtered acquired data items 406 to find data items of interest will be less (for a comparable target dataset as in FIG. 3). For example, in some cases, one or more types of data artifacts may be generated from acquired data items 406 by processing software 408.

In pipeline 300 of FIG. 3, if an investigation includes a search authorization, the processing software 308 may be configured to apply the parameters of the search authorization to the acquired forensic image 306 to extract data items that are both of interest to the forensic investigation and which comply with the search authorization. However, the acquired forensic image 306 will still include data items which possibly should not have been acquired based on the criteria of the search authorization. In FIG. 4, the step of filtering out data items which should not be acquired based on a search authorization occurs prior to acquisition from the target device and therefore once the data items are acquired the processing software 408 extracts data items of interest 410 from the filtered acquired data items 406.

Analysis software 412 is used to perform an analysis of the extracted data items of interest 410 to create investigation outputs 414. Investigations outputs 414 may be any output that provides further insight into the investigation, for example, a visualization of a timeline of events, a visualization of connections between data items, a ranking of which data items are likely to be most important to the investigation, etc.

Any of the above software components may include steps which are run following manual input by an investigator and/or include steps which occur automatically.

By the manner of acquisition of FIG. 4, unauthorized data never leaves the target device. The investigator device scans the unauthorized data to determine whether the data meets the filter criteria (generated from and encoding the authorized search parameters) and may log that such data was scanned and excluded. The only way for the investigator to access further data is to get a second, broader search authorization.

Figure 5:
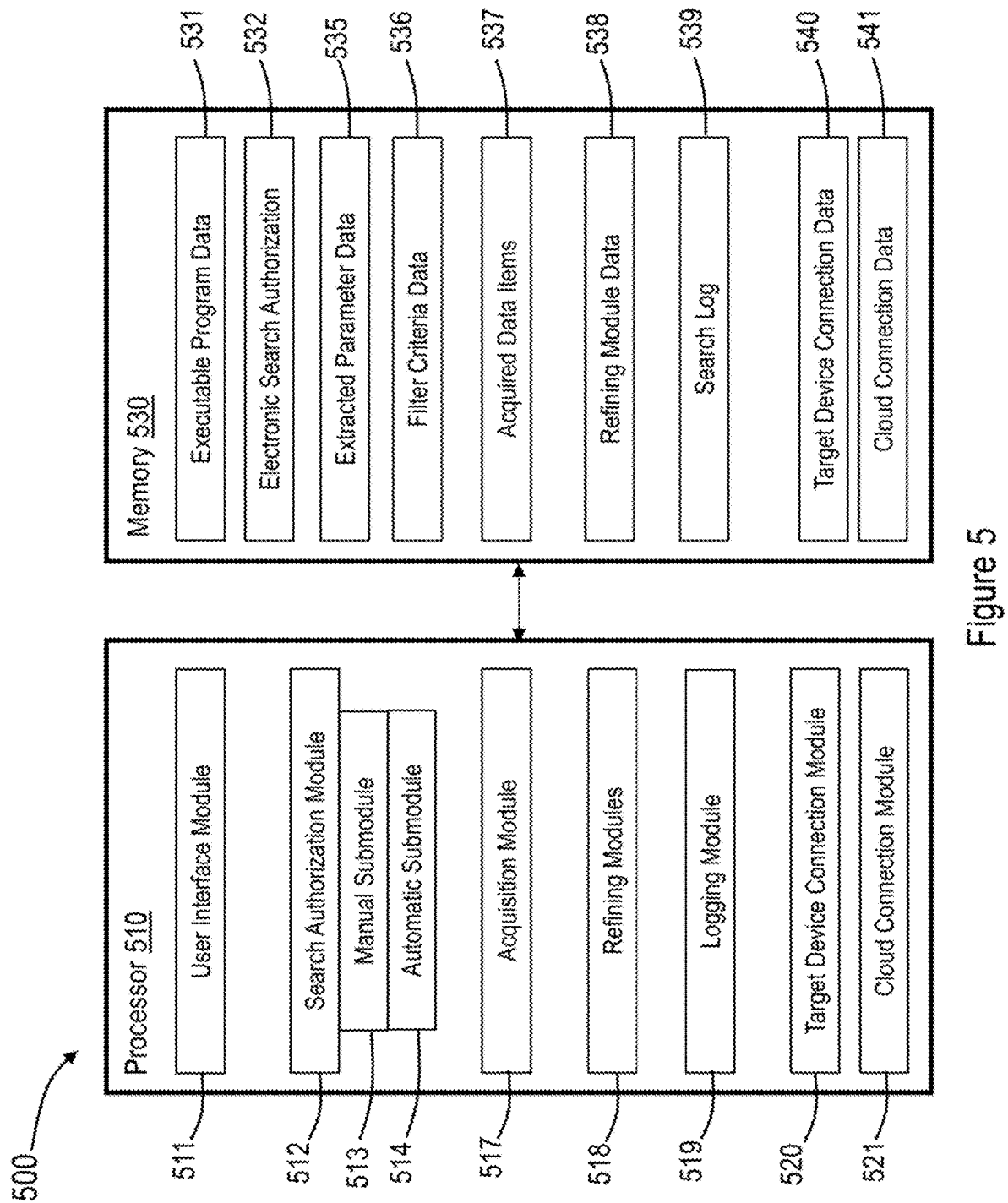
FIG. 5 is a block diagram of computer system for acquiring data items from electronic storage media of a target device in accordance with authorized search parameters, according to an embodiment.

Referring now to FIG. 5, illustrated therein is a block diagram of a computer system 500 for acquiring data items from electronic storage media of a target device in accordance with authorized search parameters, according to an embodiment. Computer system 500 may filter data items on a target device prior to acquisition. Computer system 500 may be implemented at an investigator device, such as investigator device 110 of FIG. 1. In some embodiments, computer system 500 may be implemented across multiple computer devices.

Computer system 500 includes a processor 510 and a memory 530. Memory 530 has computer-executable instructions stored thereon which, upon execution by the processor 510, cause investigator device 500 to perform the functions described herein. In other embodiments, processor 510 may include more or fewer modules or submodules and memory 530 may comprise more or less data than described in the discussion of FIG. 5. It is to be understood that the modules do not necessarily represent distinct physical modules but software or firmware modules which execute various functions on the investigator device, and that the modules and submodules may work separately or together to achieve these functions.

The investigator device 500 includes a user interface module 511. The user interface module 511 is configured to generate a user interface which enables the user (hereafter investigator) of the investigator device 510 to interact with the various modules and software on the investigator device 500 to perform a digital forensic investigation. The user interface module 511 also allows the investigator to interact with the various modules and data on the investigator device 500 when the investigator is not performing a digital forensic investigation.

The instructions and data required to run the modules of processor 510 are found in executable program data 531 in memory 530.

In some embodiments, an electronic search authorization 532 may be stored in the memory 530. The electronic search authorization 532 is a search authorization in electronic or digital format. The search authorization 532 authorizes a search of a particular scope to be performed on one or more target devices, where the scope is defined by authorized search parameters in the search authorization 532. The search authorization may be, for example, a warrant, judicial authorization, or similar formal legal document. The electronic search authorization 532 may have been converted into electronic or digital format (e.g., from a paper copy of a search authorization). In other cases, the search authorization may have been in electronic or digital format when originally created. The electronic search authorization 532 may be, for example, an electronic document. The electronic search authorization 532 may be data received via a webpage. The electronic search authorization 532 includes one or more authorized search parameters. The one or more authorized search parameters specify the scope of data that can be searched and potentially collected from a target device. For example, authorized search parameters may include a date range or list of authorized data item types or data artifact types that can be acquired from a target device.

The processor 510 includes a search authorization module 512. The search authorization module 512 is configured to extract information from the electronic search authorization 532. The search authorization module 512 extracts the parameters of the search authorization which are then stored in memory 530 as extracted parameter data 535. The extracted parameter data 535 is used to create filter criteria data 536. The filter criteria data is used to apply a filter to the target dataset during acquisition. Filter criteria data 536 is stored in memory 530.

The search authorization module 512 includes a manual submodule 513 and an automatic submodule 514. The manual submodule may be used by an investigator to manually input the parameters of the search authorization. That is, the search authorization may be received by the investigator in such a form that the parameters cannot be or cannot easily be automatically extracted from the search authorization.

The automatic submodule 514 is configured to automatically extract authorized search parameters from the search authorization. The automatic submodule 514 may be used when the search authorization is received in such a form that the parameters can be extracted without investigator input (though the investigator may check the extracted parameters for accuracy). That is, the search authorization may be electronic like electronic search authorization 532.

The automatic submodule 514 may be configured to perform optical character recognition (OCR) on the electronic search authorization 532 and automatically extract authorized search parameters from the electronic search authorization 532.

In some cases, the electronic search authorization 532 may be a form of electronic or digital form that includes a plurality of data entry fields for receiving input data from a user. The data entry form may be an electronic fillable document (e.g., fillable PDF or the like). In some cases, the data entry form may be in the form of a webpage. Data entry fields may include a selectable data entry field (e.g., a checkbox or the like) or text input fields for receiving strings of text. Generally, input data provided to data entry fields in the electronic form may be stored as a plurality of values. The values associated with relevant data entry fields specifying search parameters may be extracted or determined by the automatic submodule and, where necessary, converted into a format usable by the system 500. For example, the data entry form may include a list of selectable checkboxes each corresponding to a type of data artifact (e.g., call log artifact, chat artifact, media artifact) such that the data entry form can receive input data indicating which data artifact types are searchable or acquirable in accordance with the search authorization.

In some cases, the automatic submodule 514 may be trained, such as through a machine learning type training process, to extract authorized search parameters using example search authorizations as training samples.

The parameters of the search authorization may be inclusive or exclusive as can the filter criteria data 536. Although, any given filter criteria may be framed such that it is inclusive or exclusive. For example, a search authorization may limit the data items that can be searched to only data items created between Sep. 1, 2020, and Oct. 31 of 2020, and the criteria may be written to include all data items created between those dates or to exclude all data items not created between those dates. As another example, the search authorization may limit the data items that can be searched to only those authored by a first subject and the criteria may be written to include all data items by the subject or to exclude all data items not written by the subject. However, with multiple parameters it may be preferable to write a given criteria as inclusive or exclusive. For example, if the search authorization allows for all image files to be searched as well as all document files between two dates, writing the criteria for image files as "exclude all non-image files" would not allow acquisition of the documents, therefore the criteria may need to be written as "include all image files" and "include all document files between X and Y dates". Therefore, it may be important that automatic submodule 514 be properly configured or trained to extract parameters and create filter criteria in such a way that the correct data items are acquired from the target dataset. That is, the extracted parameters may be considered "raw" parameters while the filter criteria is a processed filter which takes into account any interactions between parameters.

Processor 510 includes acquisition module 517. The acquisition module 517 is configured to scan the target dataset on the target device and acquire data items which are compliant with the filter criteria data 536. The acquired data items are stored as acquired data items 537 in memory 530. Acquired data items 537 may include associated timestamps from the target device. The timestamps may be file system timestamps from the target device. The file system timestamps may be MAC times or MAC(b) times. MAC times are pieces of file system metadata which record when certain events pertaining to a computer file occurred most recently. MAC times may include timestamps of the latest modification (mtime) or last written time, access (atime) or change (ctime) of a certain file. By scanning the target dataset on the target device, the acquisition module 517 preserves the file system timestamps from the target device that are associated with the target dataset, thus maintaining integrity of the target dataset (which can be important in forensic investigations). If scanning were instead performed on the investigator device, the file system timestamps for the target dataset may change to reflect the investigator device timestamps of when that dataset and/or data item was created. By scanning and acquiring according to the filter criteria data 536, acquisition module 517 is configured to use filter criteria data 536 (which encodes authorized search parameters) to acquire only the data items from the target dataset which comply with the search authorization.

In some embodiments, the processor 510 may include one or more refining modules 518. Each refining module 518 is configured to search for and generate data artifacts of at least one data artifact type, as described herein. For example, refining modules 518 may include a first refining module for generating data artifacts of a first data artifact type and a second refining module for generating data artifacts of a second data artifact type.

Data relevant to the refining modules 518, including one or more artifact definitions defining one or more artifact types to be scanned for are stored in memory 530 as refining module data 538. Acquisition module 517 may be configured to execute or call one or more of the refining modules 518 during a scan of the target dataset. The parameters of the search authorization and the filter criteria data 536 may be directed towards data artifacts which exist on the investigator device as data items which may not be easily found unless a refining module is employed. A refining module may be used to search for data items which can then be compiled into a data artifact which complies with the search authorization. That is, a refining module may allow for a more complete acquisition of all data items which comply with a search authorization including those data items which exist as fragments or which have been deleted or for which attempts at obfuscation have been made. An acquisition without a refining module may only find data items which appear on the surface to comply with a search authorization while an acquisition which employs refining modules may generate additional data artifacts by finding hidden compliant data items or by compiling data items into compliant data artifacts.

In the embodiment of FIG. 5, a search authorization may be issued which allows for document-type files ("documents") created between two dates to be acquired. However, the user of the target device may have removed documents, deleted documents, changed file extensions of documents, altered dates of documents, etc. in an attempt to hide them. The system 500 may generate filter criteria data 536 for use by the acquisition module 517 to search for the appropriate documents and also choose at least one refining module appropriate for the filter criteria. For example, a refining module which was created to generate document data artifacts.

In some embodiments, a refining module submodule of the search authorization module wherein the refining submodule is configured to manually or automatically select refining modules based on the filter criteria data such that when the acquisition module 517 chooses a set of filter criteria data 536 to perform a scan the appropriate refining modules are automatically deployed.

In some embodiments, there may be a refining submodule of the acquisition module wherein the refining submodule is configured to manually or automatically assign a refining module(s) to be used to perform a scan based on the filter criteria data 536 chosen by the acquisition module 517. For example, in the system 500, a first data artifact type may have a unique artifact type identifier assigned to it. A refining module 518 for generating the first artifact type may include identifying data including the unique artifact type identifier. The automatic submodule 514 may determine the unique artifact identifier, for example when extracting search parameters or configuring search or filter criteria, and the unique artifact type identifier may be provided to the acquisition module 517. The acquisition module 517 may then use the unique artifact type identifier to execute the refining module 518 for the first data artifact type.

In some embodiments, the investigator may choose to employ a refining module 518 only if necessary based on the results of a scan by the acquisition module 517, for example, if it becomes evident that attempts have been made to delete or otherwise hide data items.

Processor 510 includes a logging module 519. Logging module 519 is configured to generate and maintain a search log 539. The search log 539 is stored in memory 530. The log 539 may include a plurality of records each corresponding to a scanned data item. The search log 539 includes information about all of the scanned data items of the target dataset. The search log 539 may include, for each scanned data item, a reason why the data item was compliant or non-compliant with the filter. Upon completion of the acquisition, each scanned data item in the search log 539 has an acquisition status of either acquired or not acquired.

For any data items which were not acquired the data item may be assigned an identifier so that the data item is included in the log 539 but no actual information about the data item is stored on the investigator device or in a manner accessible by the investigator device.

The search log 539 may include an indication of the thoroughness of the scan that was performed on the target dataset. That is, the search log 539 may include a percentage of the target dataset that was scanned. In some embodiments, the search log 539 may include a representation of the file system of the target dataset. The representation of the file system may not include identifying information about the data items within the dataset but rather can be used to prove that the target dataset was scanned completely.

The processor 510 of the investigator device 500 further includes a target device connection module 520 and a cloud connection module 521 which, in various embodiments or circumstances, can be used to establish a connection with the target dataset on a target device.

In some embodiments or circumstances, the target device connection module 520 establishes a connection between the investigator device 500 and the target device (e.g., device including data storage media storing the target dataset, such as a mobile phone, a laptop, desktop, external data storage device, etc.). The investigator device 500 may receive certain target device information, for example via the user interface module 511, which enables the investigator device 500 to access the target device (e.g., a network address of the target device). The information used to establish a connection with the target device is stored in memory 530 as target device connection data 540.

In some embodiments or circumstances, the cloud connection module 521 establishes a connection between the investigator device 500 and a cloud server (target device) storing a target dataset. The investigator device 500 may receive cloud server identifying and networking information at the investigator device 500 which enables the investigator device 500 to communicatively connect with and access the cloud server. The information associated with connecting with the cloud server is stored in memory 530 as cloud connection data 541. In some embodiments, the investigator device 500 may connect through a cloud server to a target dataset on a separate target device.

Figure 6:
FIG. 6 is a flow diagram of a method of acquiring data items from electronic storage media of a target device in accordance with authorized search parameters, according to an embodiment.

Referring now to FIG. 6, shown therein is a flow diagram of a method 600 of acquiring search authorization-compliant data items of interest from a target dataset, according to an embodiment. The method may be executed by an investigator device, such as the investigator device 500 of FIG. 5.

While method 600 refers to a single investigator device, it is to be understood that the investigator device may include multiple computing devices and various steps may occur on one or more of the computing devices of the investigator device.

At 610, at least one authorized search parameter is extracted from a search authorization by the investigator device.

As discussed above, in some embodiments, the extracted authorized search parameters may be extracted from the search authorization by an investigator and manually input into the investigator device via a user interface. These steps may be performed with and by a search authorization module and manual submodule of the investigator device. In other embodiments, the parameters may be extracted automatically by the investigator device from an electronic search authorization. These steps may be performed by an automatic submodule of a search authorization module of the investigator device. An investigator may be required to input a search authorization before the investigator device can automatically extract parameters.

At 620, the investigator device generates a set of filter criteria from the extracted parameters. As discussed above, the parameters may be considered "raw" parameters in a first format which may be processed by the investigator device into a second format wherein the parameters are encoded in the set of filter criteria. The filter criteria may specify at least one data artifact type to be scanned for, which may be identified by a unique data artifact type identifier. The unique data artifact type identifier may be used by the system to automatically identify a particular refining module (for generating data artifacts of the first data artifact type) to execute when performing acquisition.

At 630, the set of filter criteria is stored in a memory of the investigator device.

At 640, the investigator device scans the target dataset using the filter criteria for data items that comply with the filter criteria. That is, before copying any data items from the target dataset to the investigator device, acquisition software on the investigator device scans the target dataset to find any data items that comply with all of the parameters of the search authorization which have been extracted from the search authorization and compiled or encoded into the set of filter criteria. As discussed above, scanning the target dataset or the target data item(s) on the target device prior to acquisition, ensures that the filter criteria were met prior to acquisition. If the scanning of the target dataset and/or the target data item were to occur on the investigator device, and the filter criteria were not met, then an unlawful acquisition may have occurred, and this dataset may need to be deleted/removed from the acquired target dataset.

At 650, any data items that comply with the set of filter criteria are acquired from the target device. Acquired data items may include data artifacts.

The data items may be acquired by creating a forensic image of the data items on the investigator device. The acquired data items are stored in the memory of the investigator device.

The forensic image may be a bit for bit copy stored in a forensic image format. The data items may be acquired as a forensic image in, for example, DD, E01, or AFF forensic image formats. For example, the data items could be acquired as a forensic image in the DD, E01, or AFF formats. In an embodiment, the target dataset may be acquired as an AFF4-L evidence container or the like. The AFF4-L container is a standard format for logical images that is based on the AFF4 format. AFF4-L Evidence containers can include acquisitions from the cloud, targeted acquisitions, and exports of subsets of a target dataset. An AFF4-L Evidence container is a forensic format that maintains forensic integrity of the contents. AFF4-L Evidence containers can be exported and shared with other parties like counsel. Since it is a vendor-neutral, open-source standard, this format can also serve as a method of sharing and moving data between different tools. AFF4-L Evidence containers may provide strong, fast, integrity verification using compressed type Zip-tooling (like 7zip).

At 660, the investigator device generates a log (e.g., log 539 of FIG. 5) of all of the scanned data items of the target dataset.

In one embodiment, the log is created as the investigator device is scanning the target dataset. As each data item is scanned it is logged into the log and assigned a status as compliant with the filter criteria or non-compliant with the filter criteria. Accordingly, when the investigator device (acquisition module) scans a data item in the target dataset, the investigator device (e.g., via logging module) generates a record of the scanned data item in the log. A record may be created in the log for each scanned data item. The record may include a filter criteria compliance status indicating whether the scanned data item met the filter criteria (and thus was acquired) or did not meet the filter criteria (and thus was not acquired). The record may also include descriptive data indicating or proving the extent of the operation performed on the data item (and that such operation did not extend beyond determining compliance with the filter criteria). The log may be configured to include data sufficient to establish that the search and acquisition was limited in scope to the authorized search parameters and did not extend beyond. The log may also include an indication for each data item as to why the data item is compliant or non-compliant. As each scanned data item is acquired or not acquired it is assigned a status in the log as acquired or not acquired.

In some embodiments, the log may include an indication of the thoroughness of the scan of the target dataset (e.g., a percentage of all data items scanned). In some embodiment, the log may include a representation of the system of the target dataset which can be used as proof that all of the target dataset was scanned.

Where data artifacts are acquired at 650, the log generated at 660 may include data indicating which refining modules (if any) were used and which data artifacts were acquired using which refining module.

At 670, the log is stored in the memory of the investigator device.

Beyond 670, the acquired data items may be processed, for example by one or more forensic data processing tools to find data items that are of interest to the investigation and generate investigation outputs, such as described in FIG. 4.

FIG. 7 is a flow diagram of a detailed partial method 700 of acquiring data items of interest which comply with a search authorization and logging scanned data items, according to an embodiment. Method 700 begins at step 740 which is identical to step 640 of method 600.

At 740, the set of filter criteria has been created from the search authorization and the investigator device is using the set of filter criteria to scan a target dataset of a target device for data items that comply with the set of filter criteria. Steps 742-764 describe a path for a single data item.

At 742, a data item is scanned to determine if the data item complies with the filter criteria. For example, if the search authorization criteria include image files created on a particular date, scanning a data item may include scanning the data item for image file type metadata (e.g., a file extension, such as is the data item a .jpg, .tif, etc.) and scanning the data item for creation date metadata and determining whether the file type metadata and creation data metadata meet the file type and create data filter criteria.

If, at 742, the data item is determined to be compliant with the filter criteria, the method proceeds to 752. At 752, the data item is acquired by the investigator device. In some embodiments, an individual data item may be acquired "live" as it is determined to be compliant, while in other embodiments a determination of compliance may be made for all data items before any data items are acquired and then all compliant data items may be acquired together.

At 762, a record of the data item acquired at 752 is generated and included in a log file. The record may include a reason for acquiring the data item and the status of the data item as acquired.

Examples of information that may be included in the log file include, but are not limited to: a date and time stamp of when the scan started, a date and time stamp of when the data item is scanned, a Hostname of the target device (if any), an IP Address of target device (remote scan/remote acquisition, etc.), a volume name or identifier of the target device, a file path of the data item, a name of the data item (this may or may not be included for non-compliant data items), a file extension (if any), a data item status code (e.g. Compliant (Acquired) or Non-Compliant (Not Acquired)), a reason for status code (e.g. met filter criteria X, or did not meet filter criteria X), a hash value for compliant data item to verify integrity of the acquisition, logical/physical clusters of compliant data items, MAC(b) times preserved of compliant data items, any errors or failures, and if an encryption or password protected data item was discovered (and therefore unable to apply filter criteria).

In some embodiments, the reason for compliance with the filter criteria may be recorded in the log immediately upon scanning the data item (while scanning is ongoing) and recognizing compliance. In other embodiments, all data items may be scanned before the log is created or the entire acquisition may be completed before the log is created. In all embodiments, a data item is only marked as acquired once the acquisition of the data item is complete.

If, at 742, the data item is determined to be non-compliant with the filter criteria, the method proceeds to 754. At 754, the data item is not acquired by the investigator device.

At 764, a record of the data item acquired at 752 is generated and included in a log file. The record may include a reason for non-compliance of the data item and the status of the data item as "not acquired". The non-compliant data item may be assigned a name which does not identify the data item and no information which could be considered private or identifying about the data item is recorded in the log. In some embodiments, the reason for non-compliance with the filter criteria may be recorded in the log immediately upon scanning the data item (while scanning is ongoing). In other embodiments, all data items may be scanned before the log is created or the entire acquisition may be completed before the log is created.

Figure 9:
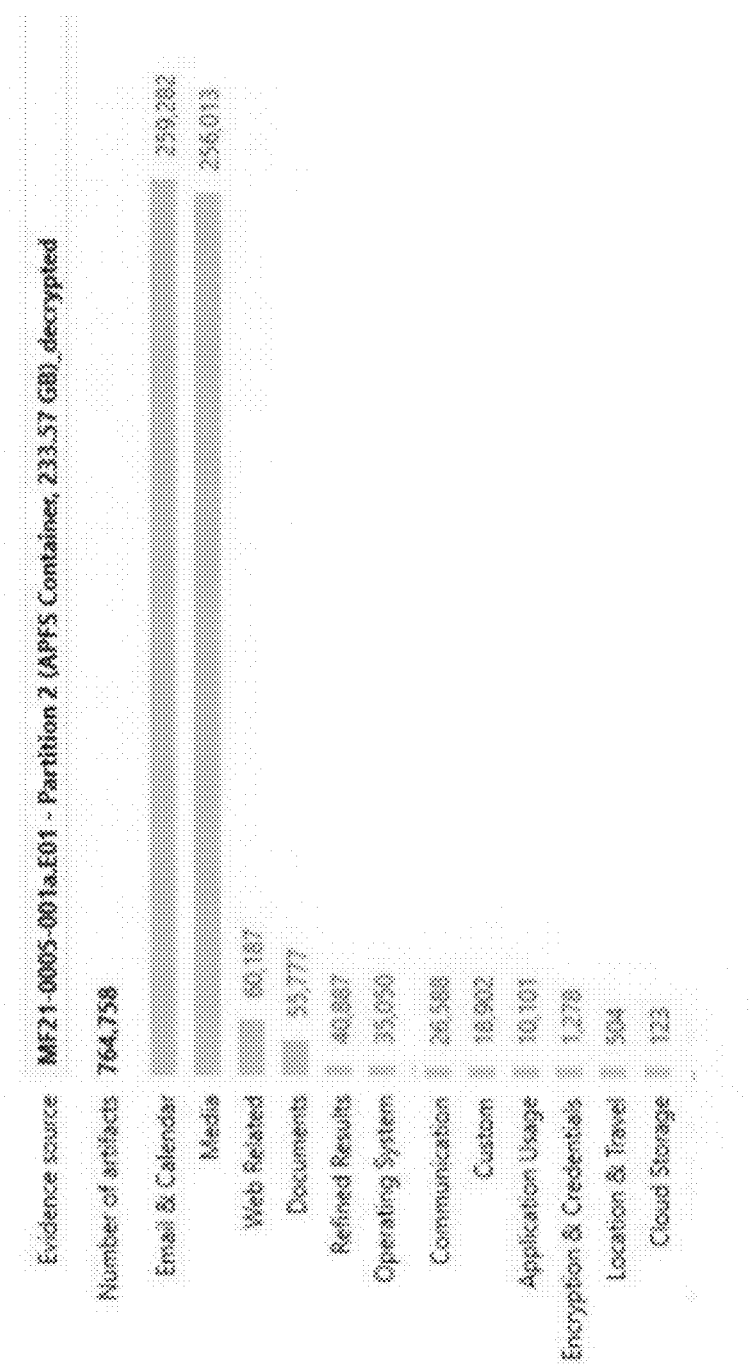
FIG. 9 is an example graphical user interface visualizing compliant data items searched and acquired from a target dataset, such as may be included in a log, according to an embodiment.

At 766, once all data items have been scanned an indication of the thoroughness of the scan is recorded in the log. In some embodiments, scan thoroughness may be recorded as a percentage of the data items from the target dataset that were scanned successfully. In some embodiments, a representation of the file system of the target dataset may be created which shows an overview of the architecture of the file system, i.e., drives, folders, files, etc., such that the representation can provide a visualization that the scan of the target dataset was complete, without having acquired or provided any access to all of the data items of the target dataset. In some embodiments, a visualization of compliant data items from a target dataset may be generated and displayed, for example, in a graphical user interface on the investigator device. An example of such a visualization of compliant data items from a target dataset is shown in FIG. 9.

While the above description provides examples of one or more apparatus, methods, or systems, it will be appreciated that other apparatus, methods, or systems may be within the scope of the claims as interpreted by one of skill in the art.

The invention claimed is:

1. A method of filtering data for acquisition during a digital forensic investigation of a target dataset stored on a target device to prevent unauthorized access of data on the target device, the method comprising:
   storing, in at least one data storage device accessible by an investigator device, a search authorization in an electronic format, the search authorization authorizing a digital forensic search of the target device according to one or more authorized search parameters, wherein the authorized search parameters specify a scope of data which is allowed to be searched and acquired;

automatically extracting, using at least one processor of the investigator device, at least one authorized search parameter from the search authorization;

generating, using the at least one processor, a set of filter criteria from the extracted at least one authorized search parameter;

storing, in the at least one data storage device, the set of filter criteria;

scanning, using the at least one processor, the target dataset using the set of filter criteria to identify data items in the target dataset which comply with the set of filter criteria;

acquiring, using the at least one processor, the data items from the target device which comply with the set of filter criteria and storing the data items in the at least one data storage device;

logging, using the at least one processor, all scanned data items of the target dataset in a log; and storing the log of the scanned data items in the at least one data storage device, wherein the log includes an acquisition status for each scanned data item, wherein the log includes a reason for compliance for each scanned data item which is acquired and a reason for non-compliance for each scanned data item which is not acquired, and wherein each unacquired scanned data item in the log is assigned a name which does not identify the data item.

2. The method of claim 1, wherein the at least one authorized search parameter is input manually by an investigator via an input device at the investigator device.

3. The method of claim 1, wherein the at least one authorized search parameter is automatically extracted from the search authorization by the at least one processor of the investigator device.

4. The method of claim 1, wherein the log includes a representation of a file system of the target device.

5. The method of claim 1, wherein acquiring the data items which comply with the set of filter criteria includes executing at least a first refining module for extracting a first data artifact type from the target dataset, wherein the first data artifact type is included in the at least one search authorization parameter extracted from the search authorization.

6. The method of claim 1, further comprising configuring a forensic data acquisition module based on the set of filter criteria, wherein scanning the target dataset using the set of filter criteria module to identify data items that are compliant with the set of filter criteria is performed by the forensic data acquisition module.

7. The method of claim 6, wherein configuring the forensic data acquisition module based on the set of filter criteria includes configuring the forensic data acquisition module to execute at least a first refining module for extracting a first data artifact type from the target dataset, the first data artifact type included in the at least one authorized search parameter extracted from the search authorization, and wherein scanning the target dataset includes scanning the target dataset for data artifacts of the first data artifact type that are compliant with the set of filter criteria.

8. A computer system for filtering data for acquisition during a digital forensic investigation of a target dataset stored on a target device to prevent unauthorized access of data on the target device, the system comprising:

an investigator device comprising:
at least one processor including:
a search authorization module operable to:
automatically extract at least one authorized search parameter from a search authorization in an electronic format, the search authorization authorizing a digital forensic search of the target device according to one or more authorized search parameters wherein the at least one search parameter specifies a scope of data which is allowed to be searched and acquired; and
to generate a set of filter criteria based on the at least one authorized search parameter;
an acquisition module operable to scan the target dataset using the set of filter criteria and acquire data items which comply with the filter criteria;
a logging module operable to generate a log of scanned data items of the target dataset, wherein the log includes a status of each scanned data item in the target dataset, wherein the status includes at least one of an acquisition status, a reason for acquisition status, and an indication of the thoroughness of the scan, and wherein each unacquired scanned data item in the log is assigned a name which does not identify the data item; and
a memory for storing the extracted at least one authorized search parameter, the set of filter criteria, the acquired data items, and the log.

9. The system of claim 8, wherein the search authorization module includes a manual submodule operable to allow a user to manually input the at least one authorized search parameter from the search authorization.

10. The system of claim 8, wherein the search authorization module includes an automatic submodule operable to automatically extract the at least one authorized search parameter from the search authorization.

11. The system of claim 8, further comprising at least a first refining module configured to scan the target dataset for data artifacts which comply with the filter criteria.

12. The system of claim 8, wherein the acquisition module is configured to execute at least a first refining module configured to extract a first data artifact type from the target dataset, and wherein the first data artifact type is extracted as an authorized search parameter from the search authorization by the search authorization module.

13. A system for filtering data for acquisition during a digital forensic investigation of a target dataset stored on a target device to prevent unauthorized access of data on the target device, the system comprising:

an investigator device comprising:
at least one processor configured to execute:
a search authorization module operable to automatically extract at least one authorized search parameter from a search authorization in an electronic format, the search authorization authorizing a digital forensic search of the target device according to one or more authorized search parameters and to generate a set of filter criteria based on the at least one authorized search parameter, the at least one authorized search parameter including a first data artifact type;
a refining module operable to extract data artifacts of the first data artifact type from the target dataset;
an acquisition module operable to scan the target dataset using the set of filter criteria and acquire data items which comply with the filter criteria, the scanning including executing the refining module to extract the data artifacts of the first data artifact type that comply with the filter criteria from the target dataset;

a logging module configured to generate a log of scanned data items of the target dataset wherein the log includes an acquisition status for each scanned data item, wherein the log includes a reason for compliance for each scanned data item which is acquired and a reason for non-compliance for each scanned data item which is not acquired, and wherein each unacquired scanned data item in the log is assigned a name which does not identify the data item; and a memory to store the extracted at least one authorized search parameter, the set of filter criteria, the first refining module, the acquired data items, the acquired data artifacts, and the log.

14. The system of claim 13, wherein the search authorization module is configured to automatically select at least one refining module which matches the set of filter criteria.

15. The system of claim 13, wherein the search authorization module is configured for an investigator to manually select at least one refining module which matches the set of filter criteria.

16. The system of claim 13, wherein the acquisition module is configured to automatically select at least one refining module which matches the set of filter criteria.

17. The system of claim 13, wherein the acquisition module is configured for an investigator to manually select at least one refining module which matches the set of filter criteria.

* * * * *